United States Patent [19]

Cairns

[11] Patent Number: 4,666,242

[45] Date of Patent: May 19, 1987

[54] UNDERWATER ELECTRO-OPTICAL CONNECTOR INCLUDING CABLE TERMINAL UNIT WITH ELECTRO-OPTICAL PROBE

[75] Inventor: James L. Cairns, Mims, Fla.

[73] Assignee: Lockheed Corporation, Burbank, Calif.

[21] Appl. No.: 623,038

[22] Filed: Jun. 21, 1984

[51] Int. Cl.⁴ .............................................. G02B 6/38
[52] U.S. Cl. ................... 350/96.21; 339/60 R; 339/117 R; 339/94 R; 350/96.20
[58] Field of Search ............... 350/96.20, 96.21, 96.22, 350/96.23, 96.18; 339/60 R, 60 C, 60 M, 89 R, 89 M, 94 R, 94 A, 94 L, 103 R, 103 B, 117 R, 177 R

[56] References Cited

U.S. PATENT DOCUMENTS

| | | | |
|---|---|---|---|
| 3,522,576 | 8/1970 | Cairns | 339/91 R |
| 3,643,207 | 2/1972 | Cairns | 339/96 |
| 4,081,208 | 3/1978 | Meade | 350/96.20 |
| 4,085,993 | 4/1978 | Cairns | 339/94 M |
| 4,140,366 | 2/1979 | Makuch et al. | 350/96.22 |
| 4,217,030 | 8/1980 | Howarth | 350/96.21 |
| 4,265,511 | 5/1981 | Nicia et al. | 350/96.18 |
| 4,373,767 | 2/1983 | Cairns | 339/94 C |
| 4,411,491 | 10/1983 | Larkin et al. | 350/96.21 |
| 4,449,784 | 5/1984 | Basov et al. | 350/96.21 |
| 4,516,829 | 5/1985 | Borsuk et al. | 350/96.20 |
| 4,544,233 | 10/1985 | Iwamoto et al. | 350/96.20 |

OTHER PUBLICATIONS

U.S. Navy technical report entitled *Coaxial Underwater Mateable Connectors*, by J. V. Wilson, Sep. 1979, Report No. TR-875, 74 pages.

Primary Examiner—John Lee
Attorney, Agent, or Firm—Brown, Martin, Haller & Meador

[57] ABSTRACT

An underwater electro-optical connector including male and female connector units, each having a longitudinal terminal socket for accepting the electro-optically conductive probe of a mating cable terminal unit. Each terminal socket has provision for forming electrical and optical connections with a terminal unit probe when the probe is inserted into it. Each probe has a central, electrically conductive tube which accepts a jacketed, buffered optical fiber and has a distal end. An optically conductive interface is provided on each probe distal end to provide an optical connection with the terminal socket into which the probe is inserted. Each probe is connected to an optical and one or more electrical conductors of a hybrid electro-optical cable. The cable terminal units mate with respective connector units, and the connector units are joined to provide, with the terminal units, an optical connection and one or more concentric elecrical connections between the terminated cables.

16 Claims, 6 Drawing Figures

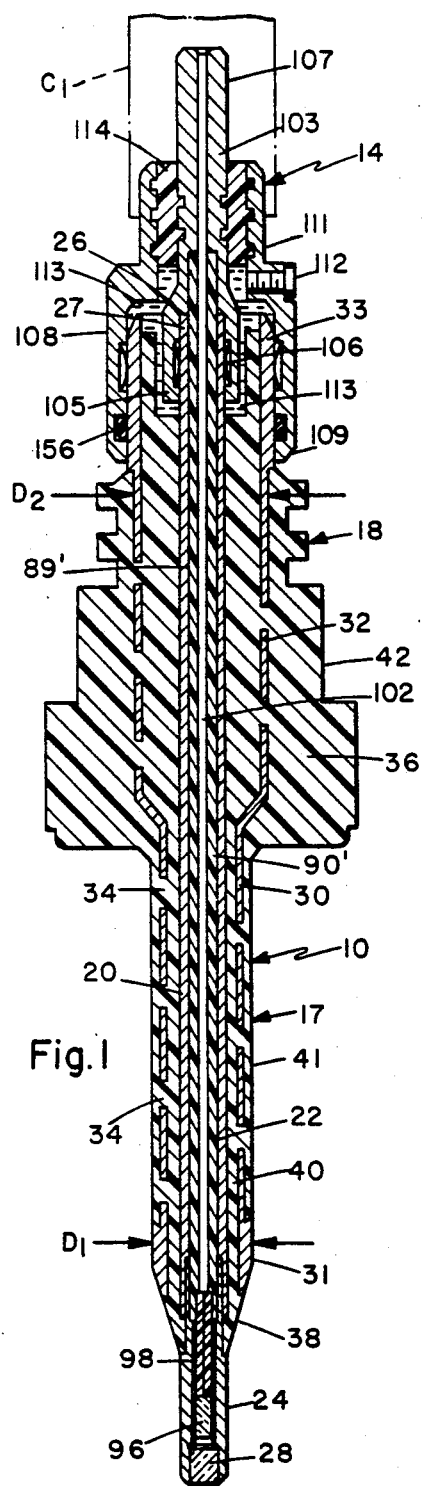
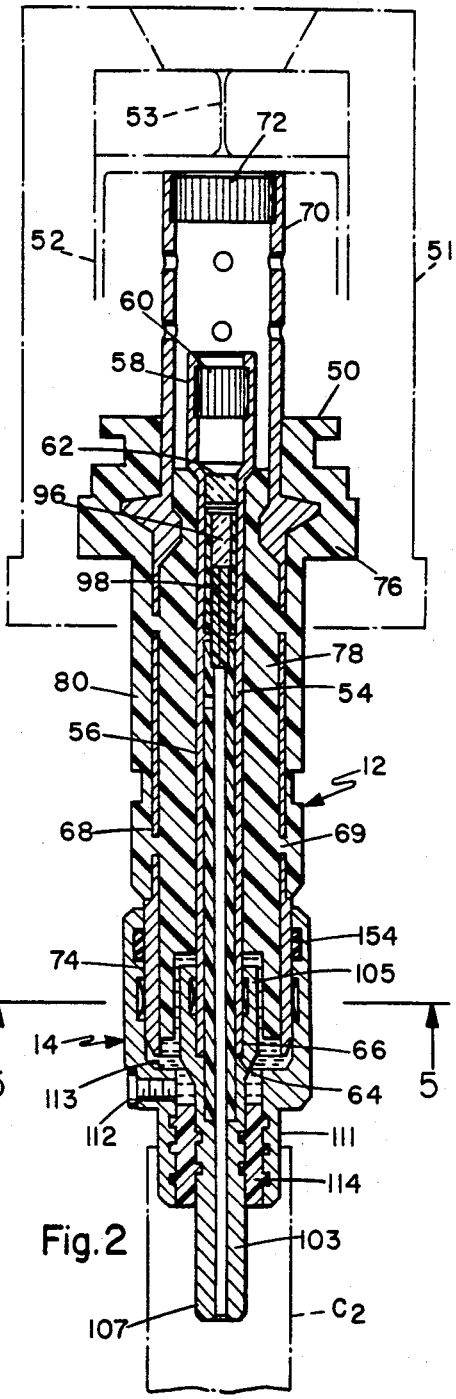
Fig.1
Fig.2

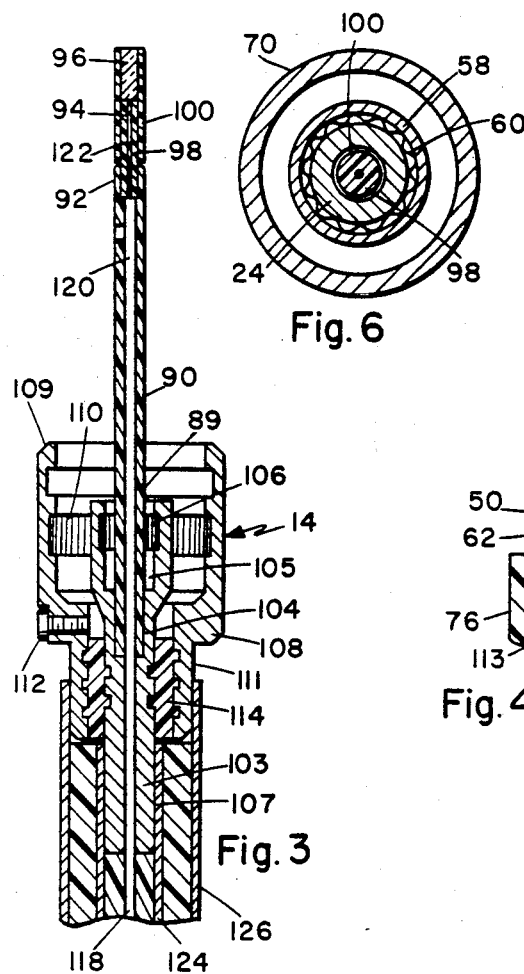
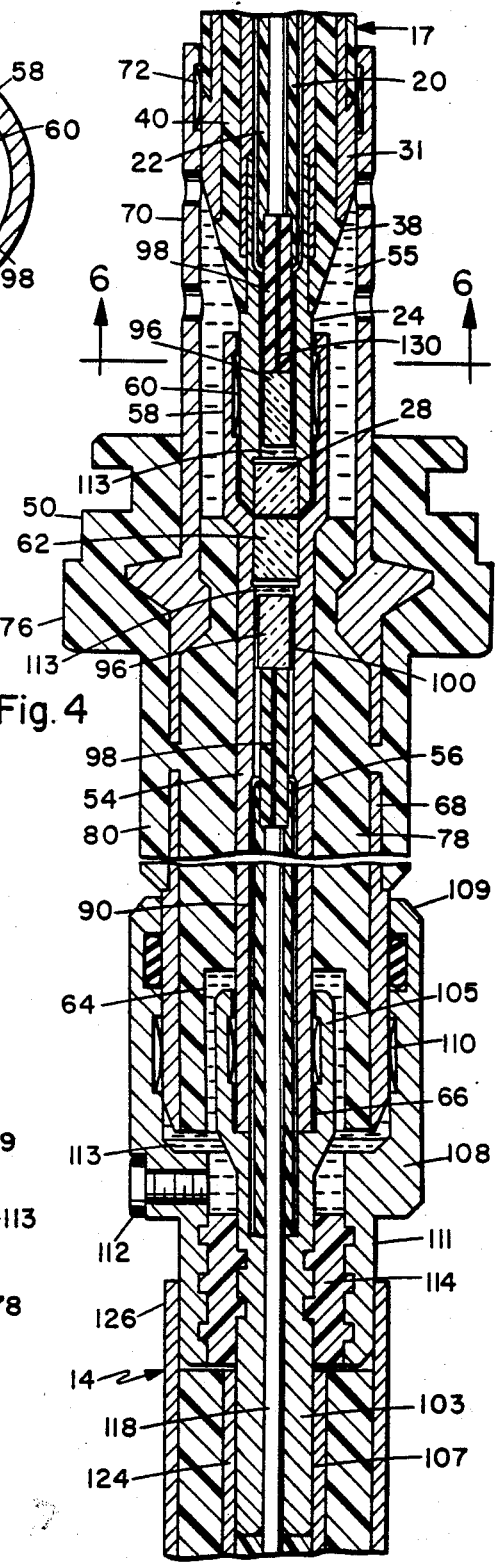
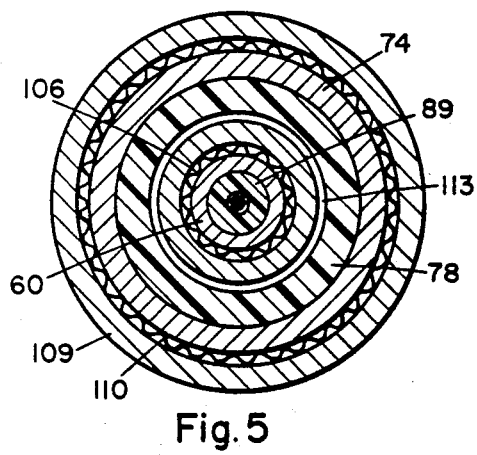

UNDERWATER ELECTRO-OPTICAL CONNECTOR INCLUDING CABLE TERMINAL UNIT WITH ELECTRO-OPTICAL PROBE

BACKGROUND OF THE INVENTION

The present invention relates to electro-optical connectors which are suitable for detachably interconnecting a pair of communications cables, each of which contains an optical and one or more electrical conductors. The invention relates particularly to such connectors which include cable terminal units for semi-permanently attaching to the cables.

In my U.S. Pat. No. 4,373,767, I have disclosed an underwater coaxial cable connector including a female connector unit containing a socket element enclosed in a dielectric fluid-filled chamber. The chamber has a novel seal through which the contact probe of a mating male connector unit is inserted. The seal is specifically designed to allow repeated cycling of the connector parts without loss of dielectric fluid or water leakage.

In my U.S. patent application Ser. No. 482,919 entitled "Underwater Connector", and filed on Apr. 7, 1983, I have further disclosed another underwater connector useful for interconnecting cables having electrical and optical conductors. The female part of the connector of my application includes a fluid-filled bladder having a penetrable seal which accommodates repeated insertion and withdrawal of an extended probe on a male connector unit without loss of fluid or water leakage.

In both cited references, a cable is terminated directly and semi-permanently with a connector unit. Terminating the cables with the connector halves in the field is virtually impossible, requiring the attendance of one or more skilled craftsmen and special equipment.

Moreover, optical conductors such as glass fibers are normally attached to a connector by non-reversible methods such as epoxying. Therefore, attachment of a connector unit to a cable carrying an optical fiber generally prevents the connector unit from being detached from the fiber without damage, and disables it from being reused with another cable. This can significantly increase installation and maintenance costs in a system comprising optical conductors. It also does not allow connectors to be used with more than one cable assembly, since they are not removable without damage. Attachment of an optical fiber to the connector is a painstaking and difficult task. In existing underwater optical connectors, the optical fibers are attached directly to the connector halves themselves. This places the entire connector in jeopardy in the event that the attachment is defective. Also, direct attachment does not allow testing the quality of the fiber junction until the connector is substantially assembled.

Therefore, there is an evident need for an underwater electro-optical connector which is reusable, interchangeable from cable to cable, does not unacceptably increase the difficulty of handling the cable to which it is attached, and is easily and reliably attached to an optical fiber.

SUMMARY OF THE INVENTION

The connector disclosed in this application fulfills the stated need by the provision of an electro-optical cable terminal unit which is easily, efficiently, and reliably attached to a cable containing electrical and optical conductors. Another substantially equivalent terminal unit is similarly connected to another electro-optical cable. Each terminal unit is detachably connected to a respective connector half for establishing the respective electrical and optical signal paths for the connector. The connector halves, connected to respective terminal units, are then joined to provide the electrical and optical connections required for interfacing the two cables. The connector halves are easily removable for maintenance or for subsequent use with other cable assemblies.

The underwater electro-optical connector of the invention includes respective male and female connector units. The male connector unit is substantially cylindrical and has a cylindrical elongate probe member with a distal tip. The probe member is electrically conductive and includes a longitudinal terminal socket which extends to the distal tip. An optically transmissive interface is placed in the end of the terminal socket at the distal tip to provide optical conductivity from the socket end through the tip.

The female connector unit includes an interior chamber with a water-resistant seal penetrable by the male unit member. Interior to the female connector is an elongate electrical conductor having a longitudinal terminal socket, one end of which is adjacent the female unit chamber. The elongate conductor further has an electrically conductive alignment socket which is disposed in the chamber adjacent the terminal socket end. The alignment socket receives the distal tip of the male unit probe member to align the male and female unit terminal sockets and to provide electrical conductivity between the probe member and the conductor. Another optically transmissive interface is disposed in the female unit terminal socket to provide optical conductivity between the end of the socket which is adjacent the chamber and the conductive alignment socket which receives the distal tip.

The connector of the invention includes a pair of cable terminal units, each of which has an elongate electrically conductive probe with a distal end. The terminal unit probe is electrically conductively received into the terminal socket of a respective connector unit with the distal end adjacent the optically transmissive interface which is disposed in the socket. The terminal unit probe has a surface to which a cable electrical conductor can be conductively attached. The probe also includes a channel for receiving an optical conductor such as a buffered optical fiber. An optically transmissive collimating lens is provided in the distal end of the terminal unit probe to provide optical conductivity between an optical conductor held in the probe channel and the optical interface in the respective connector unit terminal socket receiving the terminal unit probe.

The entire cavity between the terminal unit probe and the connector unit terminal socket is vacuum filled with an optically matched dielectric fluid which improves optical transmission and prevents crushing at high pressure.

Accordingly, it is the primary object of the present invention to provide an improved electro-optical cable connector for use underwater.

Another object of the present invention is to provide an underwater electro-optical connector having male and female connector units, each of which detachably connect to the electrically and optically conductive probe of a respective cable terminal unit.

Another object of this invention is to provide a new and improved underwater electro-optical connector having male and female parts which can be re-used.

Another object of this invention is to provide a new and improved underwater connector having a cable terminal unit with an elongate tubed probe electrically and optically conductively received into the terminal socket of a respective connector unit.

Other objects and advantages will be apparent when the following detailed description is read in conjunction with the accompanying drawings.

BRIEF DESCRIPTION OF THE DRAWINGS

FIG. 1 is a longitudinal sectional view of the male connector unit in operative engagement with a cable terminal unit.

FIG. 2 is a longitudinal sectional view of the female connector unit in operative engagement with a cable terminal unit.

FIG. 3 is a longitudinal sectional view of a cable terminal unit.

FIG. 4 is a longitudinal sectional view of an assembled connector showing the female connector unit and portions of the male and two cable terminal units.

FIG. 5 is a cross-sectional view taken along line 5—5 of FIG. 2.

FIG. 6 is a cross-sectional view taken along line 6—6 of FIG. 4.

DESCRIPTION OF THE PREFERRED EMBODIMENT

As shown in FIGS. 1-4, the underwater electro-optical connector of the invention includes a male connector unit 10, a female connector unit 12, and a pair of cable terminal units, indicated by 14 and 14'. Each of the cable terminal units 14 and 14' is connected to a respective optical conductor and one or more respective electrical conductors. The conductors may be included in hybrid electro-optical cables $C_1$ and $C_2$, each containing, for example, a buffered, jacketed optical fiber. In addition, the cables each contain one or more electrical signal conductors.

The male unit, illustrated in greatest detail in FIG. 1, is indicated generally by 10. The male unit 10 generally has a circular cross section as indicated in FIG. 5 and includes a forward elongate member 17 for detachably interconnecting with the female connector unit 12. The rear portion 18 of the male connector unit functions to provide electrical and optical interconnections with the terminal unit 14'. The elongate member 17 of the male unit includes an elongate, electrically-conductive tube 20 having a longitudinal axis which is collinear with the axis of the male connector unit 10. The tube 20 has a hollow central portion defining a terminal socket 22 which is intended to accept in close sliding engagement a probe of the terminal unit 14'. The tube 20 transitions at one end to an electrically conductive distal tip 24 (which is electrically continuous with the tube 20) and, in the rear portion 18 of the male unit has an opening 26 defining the terminal socket aperture through which the probe of the terminal unit 14' enters the male unit 10.

The rear outer surface of the tube 20 adjacent the socket 26 is exposed to provide an electrical contact plug 27 which affords a connection point for one of a plurality of electrical sockets on the terminal unit 14'. The distal end 24 of the tube 20 is sealed by an optically transparent sealing window 28.

The principal purpose of the sealing window 28 is to provide a liquid-tight barrier to prevent the intrusion of seawater into the terminal socket 22 or the escape of a dielectric fluid which is contained in the terminal socket 22. The optical characteristics of the sealing window 28 can be selected to provide filtering of any optical signal transmitted therethrough. For example, the sealing window 28 can be designed to transmit optical signals lying in a selected portion of the infrared spectrum. In order to enhance the optical transmissivity of the window 28, both of its transmissive surfaces are preferably coated with an anti-reflective compound. Further, as the connector is intended for use in the ocean, the composition of the window 28 preferably includes materials which are resistant to the corrosive effects of seawater.

The male connector unit further includes a tubular outer conductor 30 having an exposed forward connective end 31 of one diameter $D_1$ and a rearward portion 32 having another, possibly larger diameter $D_2$. The rearward portion 32 of the tubular outer conductor includes an exposed section forming a plug 33 adjacent the rear opening of the outer conductor. The plug 33 affords a second electrical contact point for interconnecting with a second electrical socket on the cable terminal unit 14'. A plurality of ports 34 are provided in the outer conductor 30 which extend radially through the conductor and are spaced intermittently along its length. These ports allow the flow of plastic material during fabrication and afterward serve to strengthen the unit by tying together the plastic inside and outside the outer conductor 30.

The male connector unit 10 is assembled by inserting the inner tube 20 coaxially through the outer conductor 30 as shown in FIG. 1 and molding the coaxial conductors in place with a thermal-setting epoxy compound 36 which physically supports the inner tube and outer conductor and provides an electrically insulating barrier between them. The epoxy 36 has a forward tapered section 38, an inner insulating section 40 and an outer shaped section 42, and does not cover the connective end 31 of the outer conductor 30. The rear portion of the inner insulating layer 40 is partially recessed to provide a cylindrical space which permits an electrical socket on the terminal unit 14' to slide over the rear contact surface 27 of the inner tube 20.

The female connector unit 12 is illustrated best in FIGS. 2 and 5; the FIG. 5 cross-section is also representative of a cross-section taken along a plane in FIG. 1, not shown, that corresponds to plane 5—5 in FIG. 2. The female unit 12 includes a cylindrical body having a forward portion, indicated generally by 50, which is contained in a sealing structure, represented by the dashed portion indicated by 51. The dashed portion 51 includes an inner chamber 52 containing a dielectric fluid 55 having selected optical characteristics. The chamber 52 is entered by the elongate member 17 of the male connector unit through a water-resistant seal 53, having a normally closed aperture, which prevents the intrusion of water into and the draining of fluid from the chamber 52. The exact structure of the sealing portion 51 can comprise, for example, the corresponding structure disclosed in my U.S. Pat. No. 4,373,767, which is incorporated herein by reference. Another suitable sealing portion structure is fully disclosed in my U.S. patent application Ser. No. 482,919, entitled "Underwater Connector", also incorporated herein by reference.

As is clear from the incorporated references, the sealing portion structure fits to the outside of the forward portion 50 of the female connector unit 12 so that the aperture of the seal 53 is oriented to be coaxial with an inner tube 54. The inner tube 54, which is also coaxial with the longitudinal axis of the female connector unit 12, comprises an elongate cylindrical tube fabricated from an electrically conductive material having a cylindrical hollow interior portion forming a terminal socket 56. The end portion of the tube 54 that is disposed in the chamber 52, is formed into a socket 58 with a retaining ring 60 for receiving and holding the distal tip 24 of the male unit elongate probe 17 when the probe is inserted through the seal socket and pushed into the interior of the chamber 52.

At the rear portion of the distal tip socket 58 where the interior of the tube 54 transitions to the terminal socket 56, a sealing window 62 is positioned in sealing engagement with the cylindrical interior of the tube. The sealing window 62, which can be attached with epoxy to the interior of the tube 54, forms a continuous liquid-tight seal between the chamber 52 and the interior of the tube 54. The window 62 is in all respects equivalent to the window 28 of the male connector unit 10.

An elongate probe on the cable terminal unit 14 is received into the terminal socket 56 through a terminal socket aperture 64 on the opposite end of the tube 54. The outside surface of the tube 54 in the area immediately adjacent the terminal socket aperture 64 forms a rear electrical plug 66 which slidably interconnects with an electrical socket on the terminal unit 14.

The female unit 12 further includes a generally tubular outer conductor 68 which is positioned coaxially with the inner tube 54 of the female unit 12. A plurality of ports 69 are formed through the outer conductor 68 intermittently along its length to strengthen the part and facilitate molding. The forward end of the outer conductor 68 is formed into a socket 70 which is coaxial with and surrounds the distal tip socket 58 formed in the inner tube 54. The outer conductor socket 70 includes an outer conductor retaining ring 72 which electrically conductively and frictionally engages the connective end 31 of the outer conductor 30 in the male terminal unit 10. At the rear end of the outer conductor 68, an exposed outer cylindrical surface 74 provides a rear contact surface for frictional and electrical engagement of an outer electrical socket on the terminal unit 14.

The inner tube 54 and outer conductor 68 of the female connector unit 12 are coaxially assembled by being molded in place by a thermal-setting epoxy 76 which provides an inner electrical insulation layer 78 between the inner tube 54 and outer conductor 68. An outer layer 80 of the thermal-setting epoxy provides various mechanical attachment surfaces for the sealing assembly 51.

One of the terminal units, terminal unit 14, is illustrated in FIG. 3 and is meant to be representative of the terminal unit 14' as well. In the preferred embodiment, the sole difference between the terminal units 14 and 14' is the greater length of the conductive probe of the terminal unit 14', which is necessary to place the end of the probe adjacent the window 28 in the elongate member 17 of the male unit. It is to be understood, however, that the dimensions of the male, female, and terminal units can be selected so that either of the terminal unit probes is of any length compatible with the dimensions of the connector unit with which it mates. Thus, a particular application environment may dictate that the probe of the terminal unit 14 be longer than or equal in length to that of the terminal unit 14'. It is to be understood, however, that no matter what the length of its probe, the operation of one terminal unit is identical with that of the other.

In the discussion which follows, identical parts which are common to terminal units 14 and 14' are assigned identical identifying numbers. Parts in terminal unit 14' that correspond functionally to similar parts in terminal unit 14, but that have different dimensions, are indicated by placing a prime mark (') after the identifying number of the part in terminal unit 14'.

Now, with reference to FIG. 3, the structure and operation of a cable terminal unit can be appreciated. As illustrated, the terminal unit 14 includes a central, cylindrical, tube 89 which forms part of an electrically and optically conductive probe 90 having a distal end 92. An optical interface assembly 94 is located adjacent the distal end 92 and includes a conventional quarter-pitch graded refractive index lens 96 (or equivalent) and a capillary tube 98. The lens and tube are butted together in physical contact and the tube 98 includes a capillary channel which extends from the free end of the tube to the end butted against the lens 96. Both the tube and the lens are held in a ferrule 100 comprising a hollow cylindrical metal sheath which extends completely over the lens 96 and partially over the capillary tube 98. The portion of the tube which is not enclosed in the ferrule 100 is inserted into the opening of the distal end 92 of the electro-optical probe 90.

The probe 90 also includes rear terminal piece 103 having a central bore with a widened portion 104. The piece 103 is press fit to one end of the inner tube 89. An end portion of the rear terminal piece is formed into a socket 105 for engaging the rear plug 27 of a connector unit. The socket 105 includes a plurality of spring contacts 106 arranged annularly within the socket 105, which frictionally and electrically engage the connector unit rear plug. The outer rear surface of the rear terminal piece forms a cylindrical contact surface 107 to which an electrical conductor can be connected by, for example, crimping or soldering. Both the tube 89 and the rear terminal piece 103 include communicating bores which form a central longitudinal channel 102.

An outer conductor shell 108, formed from an electrically-conductive material, is disposed coaxially with the elongate probe 90 and surrounds the socket 105. The forward portion of the conductive shell 108 is formed into a socket 109 having an annular arrangement of multiple contacts 110 on a forward portion of its interior surface. The socket 109 fits over the outer plug of a connector unit, with the contacts 110 providing frictional and electrical engagement between the socket and plug. The rear portion of the conductive shell 108 provides a rear contact surface 111 to which a second electrical conductor can be attached by crimping or soldering. A cap screw 112 closes a port through which a dielectric fluid (113 in FIGS. 1, 2, and 4) having controlled optical characteristics can be introduced to fill the interior of the terminal unit 14 when it has been attached to the female connector unit 12.

The outer shell 108 is placed in a mold with the pressed-together tube 89 and rear terminal piece 103, and an annular ring of thermal-setting epoxy 114 is introduced to electrically insulate and mechanically hold the outer conductor shell 108 and electro-optical probe 90.

When the connector of my invention is assembled, a cable terminal unit, for example, the unit 14, is first attached to the optical and electrical conductors of an hybrid electro-optical cable by first stripping back enough of the cable to expose a length of jacketed and buffered optical fiber 118. A length of the fiber jacket is stripped away to expose another, shorter length of optical fiber 122 which is long enough to fit into the capillary channel of the capillary tube 98. The jacketed fiber section 118 with the exposed fiber 122 is then inserted through the central bore of the probe 90 so that the fiber 122 extends beyond the distal end 92.

The optical interface assembly 94 is then fastened to the optical fiber 120 by inserting the exposed fiber 122 into the channel of the capillary tube 98 where it is held by a thermal-setting epoxy. The jacketed fiber 120 is then drawn back through the inner channel 102 until the ferrule 100 is seated against the distal end 92. The optical interface assembly may be attached to the end of the channel 102 adjacent the distal tip 92 by, for example, an adhering compound.

With the optical conductor thus attached, a length of exposed electrical conductor 124 is obtained from the cable, and is attached to the rear contact surface 107. Next, a length of a second electrical conductor, electrically isolated from the first conductor 124, is exposed and attached to the rear contact surface 111 of the outer conductive shell 108.

The second cable terminal unit 14' is similarly attached to the optical and electrical conductors of another hybrid electrical-optical cable.

As illustrated in FIGS. 1 and 2, after the cable terminal units have been attached to the ends of their respective cables the terminal units are connected to their respective associated connector units. For example, in FIG. 1, the elongate tube 89' of the terminal unit electro-optical probe 90' is inserted into the terminal socket 22 of the male connector unit so that the optical assembly 94 is adjacent the window 28 of the distal tip 24, with the graded index lens 96 separated by a minute distance from the window. At the same time that the probe tube 89' is placed in the socket 22, the probe inner socket 105 slides over and contacts the plug 27 in the rear of the inner tube 20. Similarly, the socket 109 in the outer conductive shell 108 slides over and contacts the plug 33 in the rear of the outer conductor 30. The terminal unit 14 similarly connects to the female connector unit 12 by means of a probe 90, inner socket 105, and outer conductive shell socket 109.

Next, connection of the connector halves with their associated terminal units in place is shown in FIG. 4, which is an enlarged partial cutaway view of the assembled connector without the sealing structure 51. It is to be understood, however, that the sealing structure forms an integral part of the assembled connector of my invention. When the connector halves 10 and 12 are joined, the elongate member 17 of the male connector unit 10 is inserted through the aperture of the seal 53 of the sealing structure 51 and the distal tip 24 is slid into the inner tube socket 58 where it is held by the retaining ring 60. This is illustrated in FIGS. 4 and 6. At the same time, the connective end 31 of the outer conductor 30 slides into the outer conductor socket 70 and is held by the outer conductor retaining ring 72. Thus assembled, an optical path is provided through the connector of the invention from the end of a fiber 130 which is butted against the graded index lens 96 of the terminal unit 14'. The optical output of the fiber 130 is collimated by the lens 96 and travels through the dielectric index-matched fluid 113, the window 28 and then through the index-matched fluid 55 in the chamber 52 between the windows 28 and 62. The output next travels through the window 62 and the index-matched fluid 113 to the collimating lens 96 held in the distal end of the probe 90 of the terminal unit 14. The lens 96 focuses the optical output onto the end of the fiber 122 which butts against it.

As illustrated in FIGS. 1, 2, and 4, a first electrical path runs from the conductor 124 which is electrically continuous with the socket 105 in the terminal unit 14. The conductor 124 is electrically connected, by way of the socket 105, the plug 66 contacted by the socket, the inner conductive tube 54, and the socket 58 of the female unit, to the distal tip 24 of the male connector unit. This electrical path extends further from the distal tip 24 through the tube 20 of the male unit 10, the socket 105 of the terminal unit 14' and to an electrical conductor, not shown, which can be attached to the rear contact surface of the socket.

Finally, an outer electrical path, concentric with and electrically isolated from the first path, runs from the conductor 126, through the socket 109 of the terminal unit 14, the outer conductor 68 and socket 70 of the female connector unit, the conductor connective end 31 of the male unit 10, the outer conductor 30, and the outer conductive shell socket 109 of the terminal unit 14'; the path can be completed to an electrical conductor, not shown, attached to the rear contact surface of that socket.

The cavities between the terminal sockets and the terminal unit probes are filled with the fluid 113 when the connector is assembled as illustrated in FIG. 4. To inject the fluids into the cavities, each cap screw in each terminal unit is removed and a dielectric fluid having an index of refraction which is substantially equal to that of the lens in the respective terminal unit probe is injected under vacuum into the interior of the terminal unit. The fluid flows within the interior of the terminal unit and, by capillary and vacuum action, into the terminal socket of the associated terminal unit. When the interior of the terminal unit and the terminal unit socket have been filled, the fluid will occupy the space between the graded index lens in the probe and the sealing window in the end of the socket. This will serve to reduce the optical losses incurred in transmission of light between the lens and the window. It also fills any voids, strengthening the part against crushing due to extreme pressure encountered in the undersea environment for which the connector is intended. After the fluid has been injected, the cap screws are replaced in their sockets to retain the fluid. The fluid injected into each cavity also seals the cavity and prevents the associated terminal unit from being easily removed due to the vacuum that would be created by its withdrawal.

As is illustrated, O-rings 154 and 156 are provided between the terminal outer conductive shells and the rear portion of the associated connector unit outer conductors. With the connector assembled as illustrated in FIG. 4, it may be potted by an appropriate water-resistant compound to preserve the physical integrity of the cable, or it may be covered by a prefabricated mechanical boot seal. Alternatively, threaded, rotatable attachment bodies may be provided which are suitable for detachably interconnecting the assembled connector illustrated in FIG. 4. Such connecting bodies are taught, for example, in my U.S. Pat. No. 4,373,767. The connecting bodies can extend, for example, from the terminal unit 14 to the terminal unit 16 and enclose therebetween both of the terminal units and the connector units of the connector.

Obviously, many modifications and variations of my invention are possible in light of the above teachings, and it is therefore understood that, within the scope of the disclosed embodiment, the invention may be practiced otherwise than as specifically described.

I claim:

1. An underwater electro-optical connector for providing interconnection between a pair of cables, each cable including an optical and one or more electrical conductors, comprising:
   a male connector unit having an elongate, electrically conductive probe member with a distal tip, a first terminal socket in said probe member having an end adjacent said tip, and first optical means for providing optical conductivity between said first socket end and said tip;
   a female connector unit having a chamber with a water-resistant seal penetrable by said probe member, an interior electrical conductor with a second terminal socket having an end adjacent said chamber, conductive alignment means in said chamber adjacent said second terminal socket end for receiving said distal tip and aligning said terminal sockets and to provide electrical conductivity between said member and conductor, and second optical means for providing optical conductivity between said second terminal socket end and said conductive alignment means; and
   a pair of terminal units, each having an electrically conductive probe for being received into the terminal socket of a respective connector unit, optical means in said probe for providing optical conductivity between said probe and the optical means of said respective connector unit, means for connecting said probe to an electrical conductor, and means for connecting an optical conductor to said terminal unit optical means.

2. The connector of claim 1 wherein each said connector unit optical means comprises an optically-conductive glass window, each said terminal unit optical connecting means comprises a longitudinal bore in a respective terminal unit probe for receiving an optical conductor, and each said terminal unit optical means comprises a collimating lens adjacent one end of and in alignment with a respective longitudinal bore.

3. The connector of claim 2 wherein each said connector unit glass window is disposed adjacent one end of the terminal socket of its connector unit and is sealed to the inner surface of the terminal socket to prevent the flow of fluid through the end of the terminal socket.

4. The connector of claim 3 wherein said terminal socket contains an optically transmissive dielectric fluid.

5. The connector of claim 3 wherein:
   said male conductive member is substantially cylindrical in shape and includes a central, electrically conductive tube containing the male unit terminal socket and forming, at one end, a distal tip,
   said female unit conductor comprises a central, electrically-conductive tube containing the female unit terminal socket, and said conductive alignment means comprises a retaining socket formed in said tube for receiving and electrically contacting said distal tip; and
   each said terminal unit probe comprises an elongate, electrically-conductive hollow tube.

6. The connector of claim 5 wherein:
   said male unit further includes a substantially cylindrical outer electrical conductor substantially coaxial with said central male unit tube and having a connective end beyond which said distal tip extends;
   said female unit further includes a substantially cylindrical outer electrical conductor, substantially coaxial with said central female conductor and having another alignment socket formed in an end adjacent said one alignment socket for receiving and electrically contacting said connective end; and
   each said terminal unit comprises an outer, electrically-conductive shell, substantially coaxial with the longitudinally-bored terminal tube, for fitting to and electrically contacting a portion of the outer conductor of the respective connector unit at the same time that the terminal unit probe is received in the connector unit terminal socket.

7. The connector of claim 2 wherein said female unit chamber is filled with an optically-conductive dielectric fluid, and said seal includes an assembly having a normally-closed aperture through which the male unit member fits in tight sealing engagement.

8. A terminal unit for being connected to an optical and one or more electrical conductors in a cable and for detachably connecting to an electro-optical connector unit having a longitudinal terminal socket for providing respective electrically and optically conductive paths and an outer electrical conductor providing another electrically conductive path insulated from said one electrically conductive path, comprising:
   an elongate electrically conductive probe for being received into said socket;
   light-conducting means mounted in said probe;
   a bore means in said probe for receiving and holding said optical conductor in optically conductive alignment with said light-conducting means; and
   means for connecting an electrical conductor to said probe.

9. The terminal unit of claim 8 further including an outer, electrically-conductive, backshell substantially coaxial with said probe for fitting to said outer conductor, and means for electrically insulating said backshell from said probe.

10. The terminal unit of claim 9 further including means for connecting another electrical conductor to said backshell.

11. An underwater electro-optical connector for interconnecting a pair of optical and one or more pairs of electrical conductors, comprising:
   a male connector unit having an elongate member including a substantially cylindrical outer electrical conductor and an electrically conductive tube coaxial with said outer conductor with a distal tip which protrudes from an end of the outer conductor, and an optically transmissive interface in said distal tip;
   a female connector unit having a fluid-filled chamber with a seal penetrable by said member, first and second socket means in said chamber for receiving and electrically connecting to said distal tip and outer conductor, respectively, an interior electrically conductive tube connected to the first socket means and having an optically transmissive interface adjacent said first socket means, and in optical communication with said distal tip optical interface when said distal tip is received in said first socket means, and an outer electrical conductor connected to said second socket means;

a pair of cable terminal units, each having an elongate electrically and optically conductive probe for being received in a tube in a respective connector unit, means in said probe for conductively connecting said probe to one of one pair of electrical conductors, means in said probe for conductively connecting said probe to one of said pair of optical conductors, and outer conductor means for providing electrical conductivity between the outer conductor of the respective terminal unit and one of another pair of electrical conductors.

12. The connector of claim 11 wherein each terminal unit probe includes:

a central electrically conductive tube having a distal end which is disposed adjacent the optically transmissive interface of said respective connector unit when said probe is received in said connector unit tube;

an optical lens assembly in said terminal unit tube adjacent said distal end for being connected to said optical conductor; and a portion of said terminal unit tube adapted for connecting to said one of one pair of electrical conductors.

13. An underwater optical connector for providing interconnection between a pair of optical conductors, comprising:

a male connector unit having an elongate probe member with a distal tip, a terminal socket with an end adjacent said tip, optical means for providing conductivity between said male unit terminal socket end and said tip;

a female connector unit having a chamber with a watertight seal penetrable by said probe member, a terminal socket with an end adjacent said chamber, alignment means in said chamber for receiving said distal tip and aligning said terminal sockets, and optical means for providing optical conductivity between said female unit terminal socket and said alignment means; and a pair of terminal units, each having a probe for being received in a terminal unit socket, optical means in said probe for providing optical conductivity between said probe and a connector unit optical means, and means for connecting an optical conductor to said terminal unit optical means.

14. A terminal unit for being connected to an optical fiber in a cable and for detachably connecting to either of two mateable connector halves which can be joined to form an optical connector, each of said connector halves having a longitudinal optical terminal socket and an optical interface within said terminal socket, said terminal unit comprising:

an elongate probe for being removably received in said optical terminal socket;

a light-conducting lens contained in the end of said probe;

means in said probe for receiving and holding the free end of an optical fiber in alignment with said light-conducting lens; and means for detachably seating said terminal unit probe in said connector socket.

15. An underwater electro-optical connector for providing interconnection between a pair of electro-optical cables, each cable including an optical and one or more electrical conductors, comprising:

a first connector unit including a hollow, electrically-conductive connector probe with a distal tip and first optical means for providing optical conductivity through said distal tip;

a second connector unit having a fluid-filled chamber penetrable by said connector probe, an interior hollow electrical conductor with an end disposed in said chamber, conductive alignment means on said conductor end for electrically-conductively receiving said distal tip, and second optical means for providing optical conductivity between said conductive alignment means and the interior of said electrical conductor; and a pair of terminal units, each having an electrically-conductive terminal unit probe for being received into said connector probe or said second connector unit electrical conductor, optical means in each of said terminal unit probes for providing optical conductivity between said terminal unit probe and said first or said second optical means, and means for receiving and optically connecting an optical conductor to said terminal unit optical means.

16. The underwater electro-optical connector of claim 15 wherein each of said terminal units further includes means for detachably seating said terminal unit in said connector probe or said second connector unit electrical conductor.

* * * * *